(12) United States Patent
Hidaka et al.

(10) Patent No.: US 8,489,279 B2
(45) Date of Patent: Jul. 16, 2013

(54) DAMPING FORCE CONTROL APPARATUS

(75) Inventors: Seiji Hidaka, Toyota (JP); Akihito Yamamoto, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 933 days.

(21) Appl. No.: 12/605,873

(22) Filed: Oct. 26, 2009

(65) Prior Publication Data

US 2010/0106368 A1    Apr. 29, 2010

(30) Foreign Application Priority Data

Oct. 27, 2008    (JP) ................................. 2008-275972

(51) Int. Cl.
*B60G 17/016* (2006.01)
(52) U.S. Cl.
USPC ................. 701/38; 701/36; 701/37; 701/10
(58) Field of Classification Search
USPC .................................... 701/37, 38; 280/5.515
See application file for complete search history.

(56) References Cited

U.S. PATENT DOCUMENTS

| 5,322,320 | A | 6/1994 | Sahashi et al. | |
| 5,324,069 | A | 6/1994 | Ogawa | |
| 8,032,282 | B2 * | 10/2011 | Yamanaka et al. | 701/37 |
| 8,108,102 | B2 * | 1/2012 | Furuichi et al. | 701/37 |
| 2002/0045977 | A1 * | 4/2002 | Uchiyama et al. | 701/37 |
| 2003/0141157 | A1 * | 7/2003 | Stiller et al. | 188/299.1 |
| 2004/0212159 | A1 * | 10/2004 | Stiller | 280/5.515 |
| 2005/0085970 | A1 * | 4/2005 | Song et al. | 701/38 |
| 2006/0293817 | A1 * | 12/2006 | Hagiwara et al. | 701/40 |
| 2008/0004771 | A1 * | 1/2008 | Masamura | 701/37 |
| 2008/0009992 | A1 * | 1/2008 | Izawa et al. | 701/37 |

(Continued)

FOREIGN PATENT DOCUMENTS

| JP | 05-294122 A | 11/1993 |
| JP | 06-143965 A | 5/1994 |

(Continued)

OTHER PUBLICATIONS

Extended European Search Report issued by the European Patent Office in corresponding EP 09 17 3738, Feb. 15, 2010, EPO, The Hague, The Netherlands.

(Continued)

*Primary Examiner* — Thomas Black
*Assistant Examiner* — Paul Castro
(74) *Attorney, Agent, or Firm* — Buchanan Ingersoll & Rooney PC

(57) ABSTRACT

A damping force control apparatus includes a damping force control device controlling a damping force of a shock absorber provided between a sprung mass and an unsprung mass of each wheel of a vehicle, a detection device detecting at least an acceleration of the sprung mass in an up-down direction and a relative displacement between the sprung mass and the unsprung mass, a damping coefficient calculation device calculating a damping coefficient to be applied to the damping force control by the damping force control device based on detected results of the detection device, a sensed acceleration increment calculation device calculating a sensed acceleration increment corresponding to an increment of sense according to the Weber Fechner law on the basis of the detected results of the detection device, and a modification device modifying the damping coefficient in accordance with a sensed acceleration increment calculated by the sensed acceleration increment calculation device.

9 Claims, 3 Drawing Sheets

U.S. PATENT DOCUMENTS

| | | | |
|---|---|---|---|
| 2008/0059025 A1* | 3/2008 | Furuichi | 701/37 |
| 2008/0262690 A1 | 10/2008 | Hidaka et al. | |
| 2009/0164064 A1 | 6/2009 | Yamanaka et al. | |
| 2010/0106368 A1* | 4/2010 | Hidaka et al. | 701/38 |

FOREIGN PATENT DOCUMENTS

| | | |
|---|---|---|
| JP | 6-156036 A | 6/1994 |
| JP | 2911368 B2 | 6/1999 |
| JP | 2008-254600 A | 10/2008 |
| JP | 2008-265610 A | 11/2008 |

OTHER PUBLICATIONS

Japanese Office Action (Reasons) dated Sep. 18, 2012, issued in corresponding Japanese Patent Application No. 2008-275972, and English language translation of Office Action. (5 pages).

U.S. Appl. No. 12/340,056, filed Dec. 19, 2008, Yamanaka et al.

"A Kinetics Model of Traffic Environments for Intelligent Vehicle Guidance" distributed at 5th World Congress on Intelligent Transport Systems, Oct. 12-16, 1998, Seoul Korea.

* cited by examiner

F I G. 3
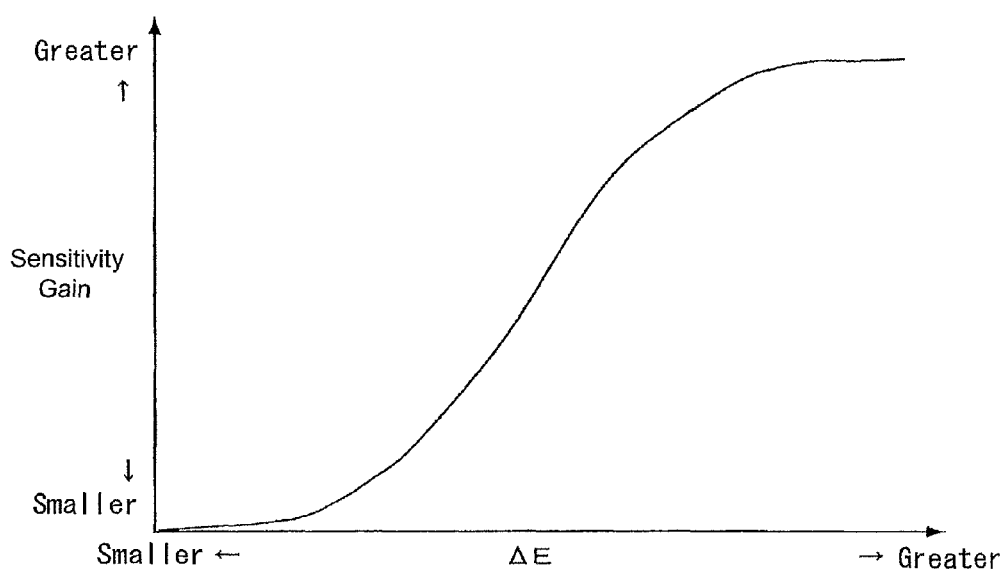

DAMPING FORCE CONTROL APPARATUS

CROSS REFERENCE TO RELATED APPLICATIONS

This application is based on and claims priority under 35 U.S.C. §119 to Japanese Patent Application 2008-275972, filed on Oct. 27, 2009, the entire content of which is incorporated herein by reference.

TECHNICAL FIELD

This disclosure relates to a damping force control apparatus. More particularly, the disclosure pertains to a damping force control apparatus controlling damping force of a shock absorber provided between the sprung mass and the unsprung mass of each wheel of a vehicle.

BACKGROUND

Various control theories, for example, the skyhook theory, are known to be applied to a damping force control of a vehicle. In application of those theories, a shock absorber has characteristics that a vibration of sprung mass and a vibration of unsprung mass can be restrained if a high damping coefficient is selected, however, the shock absorber cannot restrain a high frequency component which is equal to or greater than a resonance frequency of the unsprung mass. To the contrary, if a low damping coefficient is selected, a vibration of sprung mass and a vibration of unsprung mass cannot be restrained. Particularly, in a case where the skyhook theory is applied, because restraining the vibration of the sprung mass is prioritized, when a vehicle travels on an unleveled or unpaved road surface, an input of the high frequency component which represents an unevenness of a road surface is increased.

For example, JPH05-294122A discloses an apparatus which modifies an actual damping coefficient to increase when a low frequency component of an oscillation input which is processed by a low-pass filter is greater, thus to enhance effects of a control based on the skyhook theory. However, the apparatus disclosed in JPH05-294122A is not constructed considering the high frequency component and the human sensitivity. According to JPH06-143965A, how the human feels and how to control the damping force to enhance the feeling of the occupants is considered in a case where an input in the vicinity of a resonance point of the sprung mass (floating feeling) and an input in the vicinity of a resonance point of the unsprung mass (feeling roughness) are simultaneously inputted. JPH06-143965A further proposes, the greater the high frequency component is in the oscillation of a vehicle body, to modify the damping force to the lower level in order to make the ride quality consistent with the operational stability at higher level even when the vehicle drives on the unleveled or unpaved road surface considering the human sensitivity. Regarding the view point of the human sensitivity, JP2911368B discloses the equation of motion of a vehicle which follows a preceding vehicle with a comfortable fore-aft movement which is consistent with the occupant's physiological senses. Further, the Weber Fechner law begins to be considered in various fields.

Notwithstanding, according to the construction disclosed in JPH05-294122A, although the vibration of sprung mass is actively restrained by increasing a gain in a case where the low frequency component is greater by applying the low-pass filter, there is a possibility that the ride quality is deteriorated because of feeling roughness when the high frequency component is inputted. Further, according to the construction disclosed in JPH06-143965A, although the damping force is modified to the lower level in response to the high frequency component even if the large number of low frequency components are included in light of the human sensitivity, the vibration of sprung mass becomes difficult to be restrained by the reduced degree of the damping force. Thus, the disclosure of JPH06-143965A is hardly the most efficient method for modifying the damping force when the human sensitivity is taken into consideration.

On the other hand, irrespective of the frequency bands such as the high frequency and the low frequency, focusing on the human's sensitivity, the sensitivity of the human to the effects obtained by controlling the damping force, for example, the sense that the oscillation is reduced, can be quantified using the Weber Fechner law. Accordingly, for example, by setting a value obtained by applying the Weber Fechner law as a modification gain, and by applying the modification gain to a known skyhook control, or the like, an optimum modification to the damping force control taking the human's sensitivity into consideration can be performed.

A need thus exists for a damping force control apparatus which is not susceptible to the drawback mentioned above

SUMMARY

In light of the foregoing, the present invention provides a damping force control apparatus, which includes a damping force control means controlling a damping force of a shock absorber provided between a sprung mass and an unsprung mass of each wheel of a vehicle, a detection means detecting at least an acceleration of the sprung mass in an up-down direction and a relative displacement between the sprung mass and the unsprung mass, a damping coefficient calculation means calculating a damping coefficient to be applied to the damping force control by the damping force control means based on detected results of the detection means, a sensed acceleration increment calculation means calculating a sensed acceleration increment corresponding to an increment of sense according to the Weber Fechner law on the basis of the detected results of the detection means, and a modification means modifying the damping coefficient in accordance with a sensed acceleration increment calculated by the sensed acceleration increment calculation means.

BRIEF DESCRIPTION OF THE DRAWINGS

The foregoing and additional features and characteristics of the disclosure will become more apparent from the following detailed description considered with the reference to the accompanying drawings, wherein:

FIG. 3 is an example of a relationship between a sensed acceleration increment and a sensitivity gain according to the embodiment.

DETAILED DESCRIPTION

Figure 1:
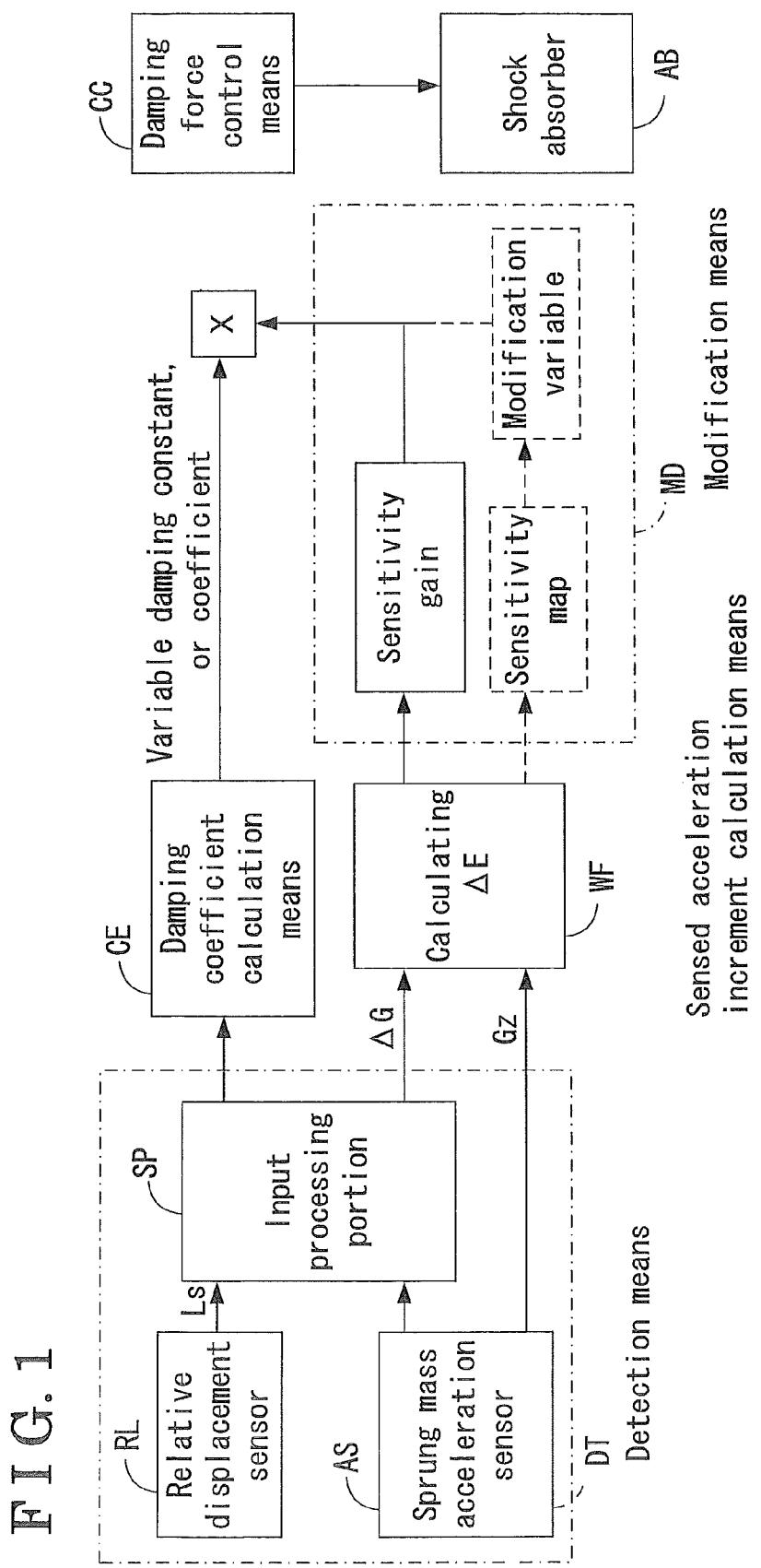
FIG. 1 is a block view showing a main construction of a damping force control apparatus according to an embodiment.

One embodiment of a damping force control apparatus will be explained hereinafter referring to illustrations of the drawing figures as follows.

The Weber Fechner law is a physiological law which describes the human senses. According to the Weber Fechner law, where I is physical magnitude of stimuli, $\Delta I$ is an increment of stimuli, and $\Delta E$ is an increment of sense, the following equation is applied: $\Delta E = k*(\Delta I/I)$, where k is a constant factor. Accordingly, if $\Delta I$ is reduced by controlling the damping force by $\Delta I'$, the increment of the sense $\Delta E$ is reduced by $k*(\Delta I/I)$. Namely, the increment of the sense $\Delta E$ which can be, for example, reduced is the sensitivity that the human senses such as the sense that the oscillation is reduced. And where the acceleration z" is applied as the physical magnitude of stimuli I, $\Delta E$ which satisfies the Weber Fechner law is described as the following equation: $\Delta E = k*(\Delta z''/z'')$, where k is a constant factor. As foregoing, a variable damping constant, or coefficient (a damping coefficient) is modified in accordance with a sensed acceleration increment $\Delta E$ which is obtained by the foregoing equation and describes an increment of the human sense such as the sense that the oscillation is reduced. The sense that the oscillation is reduced is explained as an example of the increment of the sense $\Delta E$ according to the embodiment, however, any physical quantity that the human can sense and its increment may be applied to obtain the increment of the sense $\Delta E$.

As shown in FIG. 1, the damping force control apparatus of the embodiment includes a damping force control means CC which controls a damping force of a shock absorber AB which is provided at each of vehicle wheels between a sprung mass and an unsprung mass, a detection means DT which detects at least an acceleration in an up-down direction, or a vertical direction of the sprung mass and a relative displacement between the sprung mass and the unsprung mass, and a damping coefficient calculation means CE which calculates a variable damping constant, or coefficient which is applied to the damping force control by the damping force control means CC on the basis of detected results of the detection means DT. For example, the damping force control apparatus is controlled based on a skyhook control. Although the control based on the skyhook theory is performed in this embodiment, other control methods may also be applied.

Figure 2:
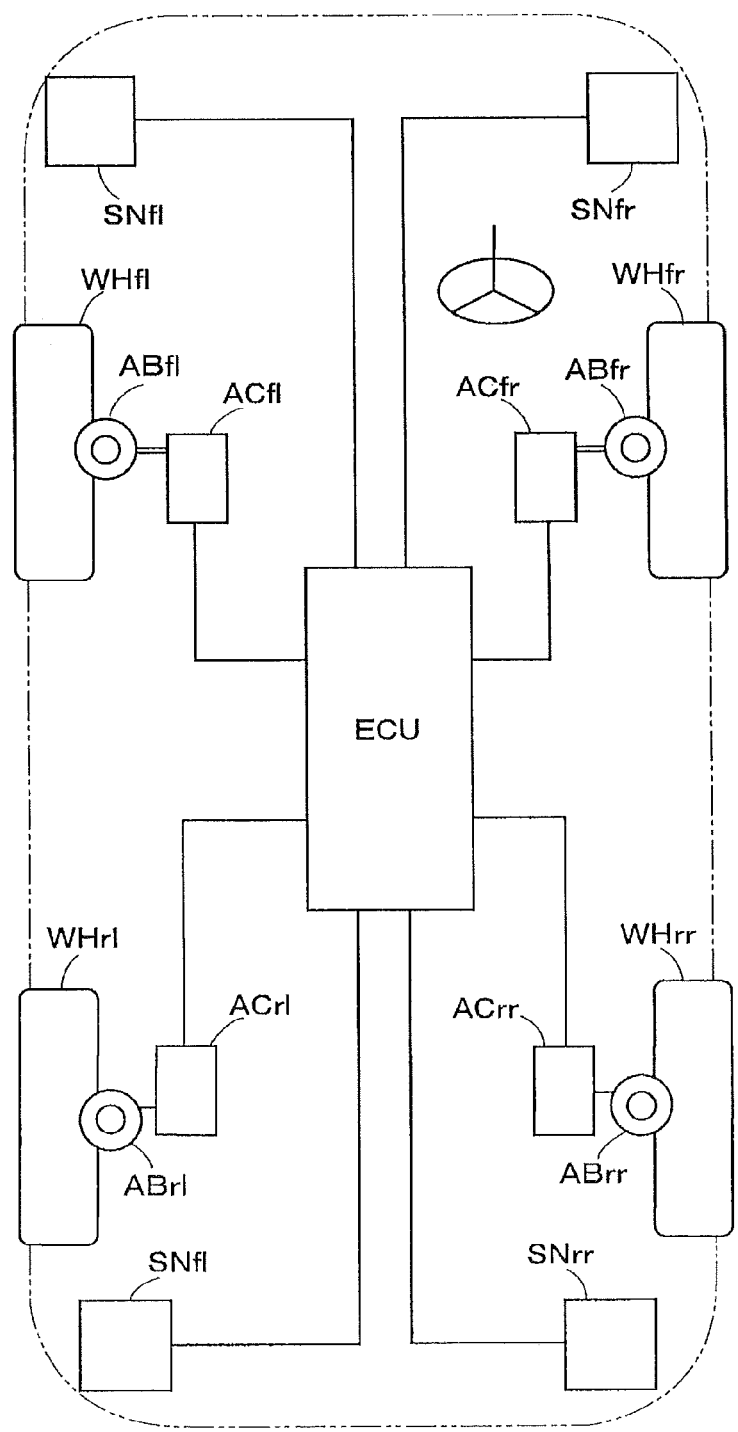
FIG. 2 is a plane view showing a construction of a vehicle which includes the damping force control apparatus according to the embodiment.

Referring to FIG. 2 showing an overview of a vehicle having the damping force control apparatus, the shock absorber $AB_{xx}$ is provided at each wheel $WH_{xx}$ (the symbol $_{xx}$ indicates each position of the wheels, particularly, "fr" indicates a front-right wheel, "fl" indicates a front-left wheel, "rr" indicates a rear-right wheel and "rl" indicates a rear-left wheel) and each of the wheels $WH_{xx}$ is supported by a suspension frame. A vehicle body is suspended by means of wheels $WH_{xx}$ and the absorbers $AB_{xx}$. An upper portion of the shock absorber $AB_{xx}$ of each of the wheels is supported by the vehicle body which corresponds to a sprung mass, and a lower portion of the shock absorber $AB_{xx}$ is supported by the suspension frame which corresponds to an unsprung mass. A piston which includes either an orifice or an adjusting valve for adjusting the variable damping constant, or coefficient by an actuator $AC_{xx}$ is accommodated in each of the shock absorbers $AB_{xx}$. A roll rate sensor which detects a roll speed of the vehicle body, a pitch rate sensor which detects a pitch speed of the vehicle body, and a bouncing acceleration sensor which detects a bouncing acceleration of the vehicle body, or the like, are positioned in the vicinity of the center of gravity of the vehicle and are connected to an electronic control unit ECU.

As shown in FIG. 1, the electronic control unit ECU includes a sensed acceleration increment calculation means WF which calculates a sensed acceleration increment $\Delta E$ corresponding to the increment of sense of the Weber Fechner law on the basis of the detection results by the detection means DT, and a modification means MD which modifies the variable damping constant, or coefficient in accordance with the sensed acceleration increment $\Delta E$ calculated by the sensed acceleration increment calculation means WF. The modification means MD is constructed, for example, to calculate a sensitivity gain in response to the calculated sensed acceleration increment $\Delta E$ and to modify the variable damping constant, or coefficient by multiplying the sensitivity gain by the variable damping constant, or coefficient. Alternatively, using a sensitivity map for setting modification variables in accordance with the sensed acceleration increment $\Delta E$, the variable damping constant, or coefficient may be modified in accordance with a modification variable obtained by the sensitivity map in response to the sensed acceleration increment $\Delta E$.

The detection means DT includes a sprung mass acceleration sensor AS which detects the acceleration of the sprung mass in a up-down direction, or a vertical direction (hereinafter, referred to as sprung mass acceleration $z_0''$ and indicated as Gz in FIG. 1). The sprung mass acceleration $z_0''$ detected by the detection means DT is integrated at an input processing portion SP to obtain a sprung mass speed ($z_0'$) and a variable (referred to as $\Delta_0'$ and indicated as $\Delta G$ in FIG. 1) of the sprung mass speed ($z_0'$) is calculated. Thereafter, at the sensed acceleration increment calculation means WF, based on the variable ($\Delta z_0'$) of the sprung mass speed and sprung mass acceleration ($z_0''$) detected by the sprung mass acceleration sensor AS, the sensed acceleration increment $\Delta E$ is calculated as explained hereinafter.

Further, the detection means DT includes a relative displacement sensor RL which detects a relative displacement between the sprung mass and the unsprung mass (the relative displacement is defined as $|z_1-z_0|$ and is indicated as Ls in FIG. 1). A relative speed $|z_1'-z_0'|$ is calculated at the input processing portion SP based on the detected relative displacement $|z_1-z_0|$. Thus, by adding the sprung mass speed ($z_0'$) to the relative speed $|z_1'-z_0'|$, an unsprung mass speed ($z_1'$) is obtained. Based on the sprung mass speed ($z_0'$), the unsprung mass speed ($z_1'$) and the relative speed $|z_1'-z_0'|$, the variable damping constant, or coefficient is calculated.

The sensitivity gain is calculated as follows. Where m is the mass of the sprung mass, C is the variable damping constant, or coefficient, Cmax is a maximum damping coefficient of the damping force control by the shock absorber AB, Cmin is a minimum damping coefficient, and k is spring constant of a spring connecting the sprung mass and the unsprung mass, the equation of motion is described as follows: $-mz_1''=C(z_1'-z_0')+k(z_1-z_0)$. In those circumstances, where the variable damping constant, or coefficient C is the minimum value Cmin, the equation of motion is described as follows: $-mz_1''\min=Cmin(z_1'-z_0')+k(z_1-z_0)$. Further, in a case where the variable damping constant, or coefficient C is the maximum value Cmax, the equation of motion is described as follows: $-mz_1''\max=Cmax(z_1'-z_0')+k(z_1-z_0)$. Accordingly, $\Delta z_1''$ of the damping force control by the shock absorber AB is as follows: $\Delta z_1''=(Cmax-Cmin)(z_1'-z_0')/m$. In light of the foregoing, the sensed acceleration increment $\Delta E$ which describes the sensitivity such as the sense that the oscillation is reduced, that is, $\Delta E=k*(\Delta z''/z'')$, where k is constant factor becomes as follows: $\Delta E=k*[\{(Cmax-Cmin)(z_1'-z_0')/m\}/z'']$, where k is a constant factor.

Accordingly, as shown in FIG. 3, a sensitivity gain is set in accordance with the sensed acceleration increment $\Delta E$. The sensitivity gain is multiplied by the variable damping constant, or coefficient to modify the variable damping constant, or coefficient, and a control target value of the actuator $AC_{xx}$ is set on the basis of the modified variable damping constant, or coefficient.

According to the damping force control apparatus with the foregoing structure, by quantifying the degree of how much the human, or the occupant senses that the oscillation, or vibration is reduced by performing the damping force control, the efficient damping force control can be achieved focusing on conditions, or cases that the human senses damping effects. For example, in a case where a high degree of the damping force is outputted, a vibration of sprung mass is restrained, however, in a case where the vehicle runs on a compound road having various road surface conditions and/or curves, or the like, which has possibilities to generate low frequency components and high frequency components, a stiffness generated by the damping force for the previous oscillation input is added to the next oscillation input. In those circumstances, according to the known method for modifying frequency, high frequency components are modified. By applying the Weber Fechner law likewise this embodiment, the high frequency component is modified in response to the degree of the effects that the human senses, and the application of the high damping force is not selected in a situation, or condition where the human unlikely senses the effects of high damping force. In other words, the level of damping force is modified considering an increase and a decrease of physical quantity that the human senses and is thus modified when the human senses that an increment of the physical quantity is large enough to do so. Thus, the construction of the damping force control apparatus of this embodiment enables to modify the high frequency component effectively. Accordingly, because the damping force is controlled on the basis of the human's physiological senses, uncomfortable movement of the vehicle is avoided, and the ride quality is enhanced. Further, by applying the Weber Fechner law to the damping force control apparatus, the level of the damping force can be modified irrespective of the high frequency component and the low frequency component, or the like.

According to the embodiment, the damping force control apparatus is configured to calculate the sensed acceleration increment corresponding to the increment of the sense according to the Weber Fechner law on the basis of the detected results by the detection means DT, and to modify the variable damping constant, or coefficient (damping coefficient) in accordance with the calculated sensed acceleration increment $\Delta E$. Accordingly, the damping force control is optimally modified taking the human's sensitivity such as the sense that the vibration is restrained into consideration. More particularly, by setting a value obtained by applying the Weber Fechner law, for example, as a modification gain, and applying the obtained modification gain to a control method, for example, Skyhook control to modify the damping force, the damping control which is consistent with the human sensitivity is performed compared to the known method for modifying the frequency.

According to the embodiment, the modification means MD calculates a sensitivity gain in accordance with the sensed acceleration increment $\Delta E$ and modifies the damping coefficient by multiplying the sensitivity gain by the damping coefficient.

Further, according to the embodiment, the modification means MD includes a sensitivity map for setting a modification variable in response to the sensed acceleration increment $\Delta E$, obtains the modification variable in accordance with the sensed acceleration increment $\Delta E$ calculated by the sensed acceleration increment calculation means WF based on the sensitivity map, and modifies the damping coefficient in accordance with the modification variable.

According to the embodiment, the damping force control apparatus is configured to appropriately set the modification variable in accordance with the sensed acceleration increment $\Delta E$ by applying the sensitivity gain and the sensitivity map.

According to the embodiment, the detection means DT includes a sprung mass acceleration sensor AS detecting the acceleration of the sprung mass in the up-down direction, obtains a sprung mass speed by integrating the acceleration detected by the sprung mass acceleration sensor AS, and calculates a variable of the sprung mass speed. The sensed acceleration increment calculation means WF calculates the sensed acceleration increment $\Delta E$ based on the variable of the sprung mass speed and the acceleration detected by the sprung mass acceleration sensor AS.

Further, according to the embodiment, the detection means DT includes a relative displacement sensor RL detecting a relative displacement Ls between the sprung mass and the unsprung mass, calculates a relative speed between the sprung mass and the unsprung mass based on the relative displacement detected by the relative displacement sensor RL, and obtains an unsprung mass speed by adding the relative speed to the sprung mass speed.

According to damping force control apparatus of the embodiment, the sprung mass speed and the unsprung mass speed applied to the calculation of variable damping constant, or coefficient (damping coefficient) can be detected (including calculation) with a simple construction and reasonable manufacturing cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damping force control apparatus, comprising:
   a damping force control means controlling a damping force of a shock absorber provided between a sprung mass and an unsprung mass of each wheel of a vehicle;
   a detection means detecting at least an acceleration of the sprung mass in an up-down direction and a relative displacement between the sprung mass and the unsprung mass;
   a damping coefficient calculation means calculating a damping coefficient to be applied to the damping force control by the damping force control means based on detected results of the detection means;
   a sensed acceleration increment calculation means calculating a sensed acceleration increment corresponding to an increment of sense according to the Weber Fechner law on the basis of the detected results of the detection means, the Weber Fechner law being defined as $\Delta E = k * (\Delta z''/z'')$, wherein $\Delta E$ is sensed acceleration increment, k is a constant factor, $z''$ is physical magnitude of acceleration, and $\Delta z''$ is increment of acceleration; and
   a modification means modifying the damping coefficient in accordance with a sensed acceleration increment calculated by the sensed acceleration increment calculation means.

2. The damping force control apparatus according to claim 1, wherein the modification means calculates a sensitivity gain in accordance with the sensed acceleration increment and modifies the damping coefficient by multiplying the sensitivity gain by the damping coefficient.

3. The damping force control apparatus according to claim 1,
wherein the modification means comprises a sensitivity map for setting a modification variable in response to the sensed acceleration increment, obtains the modification variable in accordance with the sensed acceleration increment calculated by the sensed acceleration increment calculation means based on the sensitivity map, and modifies the damping coefficient in accordance with the modification variable.

4. The damping force control apparatus according to claim 1, wherein the detection means comprises a sprung mass acceleration sensor detecting the acceleration of the sprung mass in the up-down direction, obtains a sprung mass speed by integrating the acceleration detected by the sprung mass acceleration sensor, and calculates a variable of the sprung mass speed; and wherein the sensed acceleration increment calculation means calculates the sensed acceleration increment based on the variable of the sprung mass speed and the acceleration detected by the sprung mass acceleration sensor.

5. The damping force control apparatus according to claim 2, wherein the detection means comprises a sprung mass acceleration sensor detecting the acceleration of the sprung mass in the up-down direction, obtains a sprung mass speed by integrating the acceleration detected by the sprung mass acceleration sensor, and calculates a variable of the sprung mass speed; and wherein the sensed acceleration increment calculation means calculates the sensed acceleration increment based on the variable of the sprung mass speed and the acceleration detected by the sprung mass acceleration sensor.

6. The damping force control apparatus according to claim 3, wherein the detection means comprises a sprung mass acceleration sensor detecting the acceleration of the sprung mass in the up-down direction, obtains a sprung mass speed by integrating the acceleration detected by the sprung mass acceleration sensor, and calculates a variable of the sprung mass speed; and wherein the sensed acceleration increment calculation means calculates the sensed acceleration increment based on the variable of the sprung mass speed and the acceleration detected by the sprung mass acceleration sensor.

7. The damping force control apparatus according to claim 4, wherein the detection means comprises a relative displacement sensor detecting a relative displacement between the sprung mass and the unsprung mass, calculates a relative speed between the sprung mass and the unsprung mass based on the relative displacement detected by the relative displacement sensor, and obtains an unsprung mass speed by adding the relative speed to the sprung mass speed.

8. The damping force control apparatus according to claim 5, wherein the detection means comprises a relative displacement sensor detecting a relative displacement between the sprung mass and the unsprung mass, calculates a relative speed between the sprung mass and the unsprung mass based on the relative displacement detected by the relative displacement sensor, and obtains an unsprung mass speed by adding the relative speed to the sprung mass speed.

9. The damping force control apparatus according to claim 6, wherein the detection means comprises a relative displacement sensor detecting a relative displacement between the sprung mass and the unsprung mass, calculates a relative speed between the sprung mass and the unsprung mass based on the relative displacement detected by the relative displacement sensor, and obtains an unsprung mass speed by adding the relative speed to the sprung mass speed.

\* \* \* \* \*